(12) United States Patent
Beier et al.

(10) Patent No.: US 12,030,663 B2
(45) Date of Patent: Jul. 9, 2024

(54) HYDROGEN TANK ASSEMBLY FOR A VEHICLE, SUCH AS AN AIRCRAFT

(71) Applicant: Airbus SAS, Blagnac (FR)

(72) Inventors: Uwe Beier, Blagnac (FR); Christian Metzner, Blagnac (FR)

(73) Assignee: Airbus SAS, Blagnac (FR)

( * ) Notice: Subject to any disclaimer, the term of this patent is extended or adjusted under 35 U.S.C. 154(b) by 101 days.

(21) Appl. No.: 17/856,327

(22) Filed: Jul. 1, 2022

(65) Prior Publication Data

US 2023/0027471 A1   Jan. 26, 2023

(30) Foreign Application Priority Data

Jul. 14, 2021 (EP) .................................... 21185667

(51) Int. Cl.
*B64D 37/06* (2006.01)
*B64D 37/08* (2006.01)
*B64D 37/10* (2006.01)
*B64D 37/30* (2006.01)

(52) U.S. Cl.
CPC ............. *B64D 37/06* (2013.01); *B64D 37/08* (2013.01); *B64D 37/10* (2013.01); *B64D 37/30* (2013.01)

(58) Field of Classification Search
None
See application file for complete search history.

(56) References Cited

U.S. PATENT DOCUMENTS

| | | | |
|---|---|---|---|
| 3,365,897 A | 1/1968 | Middleton et al. | |
| 4,817,890 A | 4/1989 | Coffinberry | |
| 2009/0025400 A1 | 1/2009 | Barthelemy et al. | |
| 2013/0167525 A1* | 7/2013 | Salih ..................... | F17C 13/001 62/51.1 |
| 2014/0026597 A1 | 1/2014 | Epstein et al. | |

FOREIGN PATENT DOCUMENTS

| | | |
|---|---|---|
| EP | 2622255 B1 | 4/2017 |
| EP | 3394498 B1 | 1/2020 |
| GB | 2197836 A | 6/1988 |
| WO | 2008133608 A1 | 11/2008 |
| WO | 2021096541 A1 | 5/2021 |

OTHER PUBLICATIONS

European Search Report; priority document Pub Date Dec. 14, 2021.

* cited by examiner

*Primary Examiner* — Rodney A Bonnette
(74) *Attorney, Agent, or Firm* — Greer, Burns & Crain, Ltd.

(57) ABSTRACT

A hydrogen tank assembly is provided for use in vehicles, such as aircraft. The hydrogen tank assembly has an inner tank wall, an outer tank wall, and an inert gas source. The inner tank wall defines a hydrogen tank volume that is surrounded by a shroud volume which is defined by the outer tank wall. The hydrogen tank volume is filled with cryogenic hydrogen and has a higher pressure than the shroud volume that is filled with an inert gas, such as helium. The counter-pressure of the inert gas prevents micro-cracks in the inner tank wall and increases the in-service life.

17 Claims, 1 Drawing Sheet

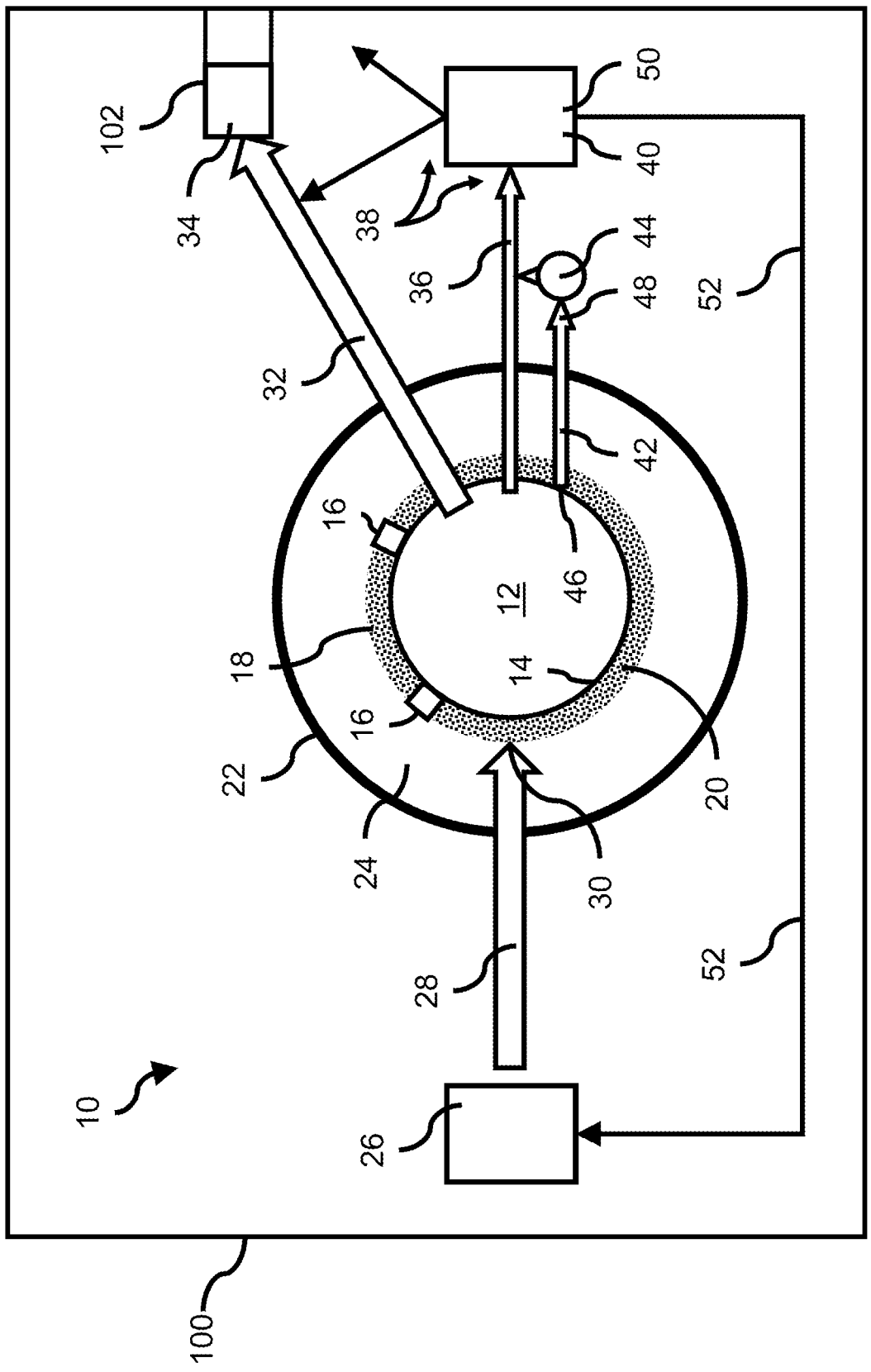

HYDROGEN TANK ASSEMBLY FOR A VEHICLE, SUCH AS AN AIRCRAFT

CROSS-REFERENCES TO RELATED APPLICATIONS

This application claims the benefit of the European patent application No. 21185667.9 filed on Jul. 14, 2021, the entire disclosures of which are incorporated herein by way of reference.

FIELD OF THE INVENTION

The invention relates to a hydrogen tank assembly for a vehicle, preferably an aircraft. The invention further relates to an aircraft having such a hydrogen tank assembly.

BACKGROUND OF THE INVENTION

Lightweight energy storage is a key topic for next generation aircraft. Hydrogen offers high energy densities, whereas the storage technique (cryogenic, compressed, solid state/absorbed) is a key issue. Hydrogen can be compressed and/or cooled down to cryogenic temperatures to increase the volumetric and gravimetric energy density. Usually, complex tank systems are needed with individual requirements to the materials, design and working principles e.g., regarding operational safety.

Compressed and cryogenic hydrogen are the techniques of choice for today's vehicles, like cars or airplanes. Cryogenic tanks can achieve the lowest added weight wherein about 0.2 kg-0.5 kg tank weight is needed per kg stored H2. Conventional tanks work with applied inner pressure to avoid gas ingress from outside. As tank material typically metals, metal alloys and composites are in use. Full composite tanks can be challenging because of the long in-service life of civil aircraft. Hydrogen leakage may also be an issue.

SUMMARY OF THE INVENTION

It is an object of the invention to improve hydrogen tanks for use in vehicles, such as aircraft.

The invention provides a hydrogen tank assembly for a vehicle, preferably for an aircraft, the hydrogen tank assembly comprising an inner tank wall that defines a hydrogen tank volume configured for storing cryogenic hydrogen at a predetermined hydrogen pressure;

an outer tank wall that defines a shroud volume which surrounds the inner tank wall; and an inert gas source that is fluidly connected to the shroud volume and configured for pressurizing the shroud volume to an inert gas pressure that is smaller than the hydrogen pressure by a predetermined amount.

Preferably, the inert gas pressure is 99%, more preferably 99.6%, of the hydrogen pressure. Preferably, the inert gas pressure is 1%, more preferably 0.4%, smaller than the hydrogen pressure.

Preferably, a pressure difference between the hydrogen tank pressure and the inert gas pressure is not greater than 30 mbar, more preferable not greater than 20 mbar, still more preferably not greater than 10 mbar.

Preferably, the hydrogen tank assembly further comprises an inner tank wall cover that is configured for allowing the inert gas to pass towards the inner tank wall for flushing hydrogen and/or configured as a thermal insulation.

Preferably, the inner tank wall cover is made of a material chosen from a group of materials consisting of open porous foam material, perforated honeycomb material, dry fiber layer material, thermal insulation material having channels.

Preferably, the inert gas source is fluidly connected by an inert gas supply line, the inert gas supply line having an end portion for discharging the inert gas. Preferably, the end portion is arranged adjacent to the inner tank wall and/or within the tank wall cover. Preferably, the inert gas is helium.

Preferably, the inner tank wall is configured as a liner. Preferably, the inner tank wall is made of a mono-resin material. Preferably, the inner tank wall is made of a fiber composite material. Preferably, the inner tank wall comprises at least one compensation member configured for reducing or preventing thermal shrinkage of the inner tank wall and/or the inner tank wall cover. Preferably, the compensation member is configured for reducing or preventing relative shrinkage between the inner tank wall and the inner tank wall cover. Preferably, the compensation member is made of an elastic meta-material that is configured for reducing or preventing thermal shrinkage of the inner tank wall. Preferably, the compensation member is made of a textile fiber material. Preferably, the textile fiber material is a nonwoven fiber material.

Preferably, the hydrogen tank assembly further comprises a main hydrogen line that is arranged for allowing a main hydrogen consumer to be supplied with hydrogen from the hydrogen tank volume. Preferably, the main hydrogen consumer is an aircraft engine.

Preferably, the hydrogen tank assembly further comprises at least one leakage line that is arranged to collect hydrogen that has leaked from the hydrogen tank volume into the shroud volume. Preferably, the leakage line comprises a leakage sensor for determining a leak rate of the hydrogen. Preferably, the leakage line comprises a check valve. Preferably, the leakage sensor is arranged upstream of the check valve. Preferably, the leakage line discharges the hydrogen into the environment.

Preferably, the hydrogen tank assembly further comprises at least one auxiliary hydrogen line that is arranged for allowing an auxiliary hydrogen consumer to be supplied with hydrogen from the tank volume. Preferably, the auxiliary hydrogen line is fluidly connected to the main hydrogen line. Preferably, the auxiliary hydrogen consumer is a hydrogen fuel cell and/or an aircraft engine. Preferably, the auxiliary hydrogen line is fluidly connected to the leakage line, preferably via a check valve.

Preferably, the hydrogen tank assembly further comprises an inert gas separator that is configured to separate hydrogen from the inert gas and a recirculation line that is arranged to transport the separated inert gas from the inert gas separator back to the inert gas source.

Preferably, the hydrogen tank assembly further comprises a selector valve that is configured to allow flow of hydrogen from the tank volume to any of the main hydrogen line, the hydrogen consumer, the fuel cell, the inert gas separator, and the environment.

The invention provides an aircraft comprising at least one engine and a preferred hydrogen tank assembly, wherein the engine is supplied with hydrogen from the hydrogen tank volume.

One idea is to provide a hydrogen tank with a double walled pressure tank system. An inert gas, such as helium, is in the outer chamber and hydrogen is in the inner chamber. The helium may have a smaller pressure than the hydrogen.

In order to reduce weight of pressurized cryogenic hydrogen tank systems composite materials offer a unique potential. If applied directly as tank wall different coefficients of thermal elongation (abbreviated: CTE) of the resin matrix and the fibers may cause cracks at cryogenic temperature. Together with the pressure difference between the hydrogen volume and the outside unwanted leakage rates may occur.

The invention proposes to reduce the driving force for leakage to a minimum by putting a counter pressure between the inner tank wall and the outer tank wall. The counter pressure shall be put by pressurized helium.

This basic configuration allows very low leakage rates—even if cracks occur in the inner tank wall. The remaining leaking hydrogen can be constantly purged thereby keeping to concentration very low. This very low concentrated hydrogen can completely be blocked by the outer tank skin that is also shielded from the cryogenic hydrogen and is thus resistant to thermally induced micro-cracks.

The inner tank wall may have a thermal insulation that allows for flushing near the inner tank wall. Materials such as open porous foams, perforated honeycombs, dry fiber layers, channels in the insulation material, etc. may be used to this end.

The pressure difference may be chosen low enough, so that the inner tank can be replaced by a thin mono-resin-material liner. The thin liner is adaptive enough to avoid micro cracks due to different CTE. In order to avoid thermal shrinkage of such thermoplastics, a compensation mechanism using elastic meta-materials may be employed.

Furthermore, it is possible to regulate the temperature driven hydrogen boil off by controlling the helium inlet temperature.

Boiled off gas mixture having hydrogen and helium can be turned into energy, water and helium via an appropriate fuel cell e.g., a proton exchanger membrane fuel cell (PEM-FC). Feedback of the helium gas back into the purging loop is also possible.

The helium has a flushing function and reduces or prevents accumulation of hydrogen in the insulation material.

The inner pressure of the inner tank wall can be kept slightly above the outer pressure of the inner tank wall by a back-pressure valve. This valve may also automatically control the helium feed. The helium feed can be constant flow controlled.

Any leakage of the hydrogen tank wall can be measured via the pressure drop in the helium system.

The outer skin may be used to integrate the tank mechanically into the main structure of the vehicle, e.g., aircraft. The outer skin may be adapted to bear structural loads. Furthermore, a leakage sensor can be employed to anticipate the tank health status.

BRIEF DESCRIPTION OF THE DRAWINGS

The FIGURE schematically shows an embodiment of a hydrogen tank assembly in an aircraft.

DETAILED DESCRIPTION OF THE PREFERRED EMBODIMENTS

Embodiments of the invention are described in more detail with reference to the accompanying schematic drawings. Therein, the only FIGURE depicts an embodiment of a hydrogen tank assembly 10 for a vehicle 100, such as an aircraft, according to the invention.

The hydrogen tank assembly 10 comprises a hydrogen tank volume 12 for cryogenic hydrogen. The hydrogen can be stored therein at cryogenic temperatures and with a hydrogen pressure of preferably 3 bar or slightly above. Under these conditions the hydrogen is generally a liquid that boils of hydrogen gas.

The hydrogen tank assembly 10 includes an inner tank wall 14 that defines the hydrogen tank volume 12. The inner tank wall 14 is made of a thin thermoplastic resin layer. The inner tank wall 14 includes a plurality of compensation members 16. The compensation members 16 may be disposed on the outer circumferential surface of the inner tank wall 14 and extend in an axial direction of the inner tank wall 14. The compensation members 16 are preferably configured to prevent thermal shrinkage of the inner tank wall 14. The compensation members 16 may be made of an elastic meta-material, which are known per se.

The hydrogen tank assembly 10 has an inner tank wall cover 18. The inner tank wall cover 18 may be configured as a thermal insulation 20. The inner tank wall cover 18 is configured to allow an inert gas, such as helium, to pass through the inner tank wall cover 18 and flush hydrogen that leaked out of the hydrogen tank volume 12 away from the inner tank wall 14. The inner tank wall cover 18 can be made of open porous foam, perforated material, or dry fiber material.

The thermal insulation 20 may also include a glass sphere material that is known in the field of cryogenics. The glass sphere material is usually a bulk material comprising a plurality of microscopic glass spheres. The glass spheres enclose a vacuum. The glass sphere material may be arranged within preformed chambers, such as those of a honeycomb structure or the like. The vacuum in the glass spheres provides excellent thermal insulation while the "porosity" of the glass sphere material allows sufficient gas movement.

It is also possible that the tank wall cover 18 and/or the thermal insulation 20 has a plurality of channels. The channels are preferably configured in plane of the respective tank wall cover 18 or thermal insulation 20 such that the tank wall cover 18 and/or the thermal insulation 20 are divided into a plurality of sections. The extent of the sections along parallel to the inner tank wall 14 is determined by the pressure differential between the inner tank volume 12 and the shroud volume 24 (see below) such that the pressure drop of hydrogen passing through the tank wall cover 18 or thermal insulation 20 does not exceed the pressure differential.

The hydrogen tank assembly 10 comprises an outer tank wall 22 (also called outer tank skin). The outer tank wall 22 surrounds the inner tank wall 14 and defines a shroud volume 24. The shroud volume 24 can be pressurized with an inert gas, such as helium, having a predetermined inert gas pressure. The inert gas pressure is chosen to be slightly smaller than the hydrogen pressure, e.g., 10 mbar less than the hydrogen pressure.

The hydrogen tank assembly 10 includes an inert gas source 26 that stores and pressurizes the inert gas. The inert gas source 26 is fluidly connected to the shroud volume 24 via an inert gas supply line 28. The inert gas supply line 28 has an end portion 30 for discharging the inert gas. The end portion 30 is arranged in the vicinity of the inner tank wall 14 or within the inner tank wall cover 18.

The hydrogen tank assembly 10 includes a main hydrogen line 32 that fluidly connects to a main hydrogen consumer 34, such as an aircraft engine 102. The main hydrogen line 32 is configured for supplying the main hydrogen consumer 34 with hydrogen.

The hydrogen tank assembly 10 includes an auxiliary hydrogen line 36. The auxiliary hydrogen line 36 includes a selector valve 38. The selector valve 38 allows the auxiliary hydrogen line 36 to fluidly connect to multiple outputs. The auxiliary hydrogen line 36 can fluidly connect to the environment for discharging excess hydrogen, to the main hydrogen line 32 or to a fuel cell 40. A check valve may be installed where needed, in order to avoid back flow.

The hydrogen tank assembly 10 has a leakage line 42. The leakage line 42 fluidly connects the shroud volume 24 to the auxiliary hydrogen line 36 via a check valve 44. The leakage line 42 collects hydrogen that has leaked through the inner tank wall 14. The leakage line 42 has an end portion 46 that is arranged in the vicinity of the inner tank wall 14 or within the inner tank wall cover 18. The leakage line 42 may include a leakage sensor 48 that is arranged downstream from the end portion 46, preferably adjacent to the check valve 44.

The fuel cell 40 may be supplied with a mixture of hydrogen and helium via the auxiliary hydrogen line 36. The fuel cell 40 transforms hydrogen and oxygen in a manner known into electrical energy and water. The inert gas does not react. The fuel cell 40, therefore, also acts as an inert gas separator 50 that is configured for separating the inert gas from the hydrogen. The fuel cell 40 is also capable of generating a pressure that causes hydrogen or a mixture of hydrogen and the inert gas to flow from the tank volume 12 or shroud volume 24, respectively, toward the fuel cell 40. The fuel cell 40 may thus act as a pump without moving parts.

The hydrogen tank assembly 10 includes a recirculation line 52 that fluidly connects the inert gas separator 50 with the inert gas source 26, so as to recirculate the inert gas back into the system.

In order to improve hydrogen tanks for use in vehicles, such as aircraft, the invention proposes a hydrogen tank assembly 10. The hydrogen tank assembly 10 has an inner tank wall 14, an outer tank wall 22, and an inert gas source 26. The inner tank wall 14 defines a hydrogen tank volume 12 that is surrounded by a shroud volume 24 which is defined by the outer tank wall 22. The hydrogen tank volume 12 is filled with cryogenic hydrogen and has a higher pressure than the shroud volume 24 that is filled with an inert gas, such as helium. The counter-pressure of the inert gas prevents micro-cracks in the inner tank wall 14 and increases the in-service life.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS hydrogen tank assembly
hydrogen tank volume
inner tank wall
compensation member
inner tank wall cover
thermal insulation
outer tank wall
shroud volume
inert gas source
inert gas supply line
end portion
main hydrogen line
main hydrogen consumer
auxiliary hydrogen line
selector valve
fuel cell
leakage line
check valve
end portion
leakage sensor
inert gas separator
recirculation line

The invention claimed is:

1. A hydrogen tank assembly for a vehicle, the hydrogen tank assembly comprising:
   an inner tank wall that defines a hydrogen tank volume configured to store cryogenic hydrogen at a predetermined hydrogen pressure;
   an outer tank wall that defines a shroud volume which surrounds the inner tank wall;
   an inert gas source that is fluidly connected to the shroud volume and configured to pressurize the shroud volume with an inert gas to an inert gas pressure that is smaller than the hydrogen pressure; and
   an inert gas separator that is configured to separate hydrogen from the inert gas and a recirculation line that is arranged to transport the separated inert gas from the inert gas separator back to the inert gas source.

2. The hydrogen tank assembly according to claim 1, further comprising an inner tank wall cover that is at least one of configured to allow the inert gas to pass towards the inner tank wall for flushing hydrogen or configured as a thermal insulation.

3. The hydrogen tank assembly according to claim 2, wherein the inner tank wall cover is made of a material chosen from a group of materials consisting of open porous foam material, perforated honeycomb material, dry fiber layer material, thermal insulation material having channels.

4. The hydrogen tank assembly according to claim 1, wherein the inert gas source is fluidly connected by an inert gas supply line, the inert gas supply line having an end portion for discharging the inert gas, and the end portion is arranged at least one of adjacent to the inner tank wall or within the tank wall cover.

5. The hydrogen tank assembly according to claim 1, wherein the inner tank wall is configured as a liner.

6. The hydrogen tank assembly according to claim 1, wherein the inner tank wall is made of at least one of a mono-resin material or of a fiber composite material.

7. The hydrogen tank assembly according to claim 1, wherein the inner tank wall comprises at least one compensation member configured to reduce or prevent thermal shrinkage of at least one of the inner tank wall or an inner tank wall cover.

8. The hydrogen tank assembly according to claim 7, wherein the compensation member is configured to reduce or prevent relative shrinkage between the inner tank wall and the inner tank wall cover.

9. The hydrogen tank assembly according to claim 1, further comprising a main hydrogen line that is configured to allow a main hydrogen consumer to be supplied with hydrogen from the hydrogen tank volume.

10. The hydrogen tank assembly according to claim 1, further comprising at least one leakage line that is arranged to collect hydrogen that has leaked from the hydrogen tank volume into the shroud volume.

11. The hydrogen tank assembly according to claim 10, wherein the leakage line comprises a leakage sensor configured to determine a leak rate of the hydrogen.

12. The hydrogen tank assembly according to claim 10, wherein the leakage line comprises a check valve.

13. The hydrogen tank assembly according to claim 1, further comprising at least one auxiliary hydrogen line that is arranged for allowing an auxiliary hydrogen consumer to be supplied with hydrogen from the hydrogen tank volume.

14. The hydrogen tank assembly according claim 13, wherein the auxiliary hydrogen line is fluidly connected to the at least one leakage line.

15. The hydrogen tank assembly according to claim 13, further comprising a selector valve configured to allow the auxiliary hydrogen line to fluidly connect to multiple outputs.

16. An aircraft comprising at least one engine and a hydrogen tank assembly according to claim 1, wherein the engine is supplied with hydrogen from the hydrogen tank volume.

17. The hydrogen tank assembly according to claim 1, wherein the inert gas separator is a fuel cell.

* * * * *